United States Patent [19]
Milde, Jr.

[11] 3,777,809
[45] Dec. 11, 1973

[54] HEATING AND COOLING DEVICE AND METHOD

[76] Inventor: Karl F. Milde, Jr., 29 Kings Ct., Brooklyn, N.Y. 10514

[22] Filed: June 9, 1971

[21] Appl. No.: 151,298

Related U.S. Application Data

[63] Continuation-in-part of Ser. No. 794,645, Jan. 28, 1969, abandoned.

[52] U.S. Cl. ............... 165/54, 165/61, 55/16
[51] Int. Cl. ............................................ F24h 3/02
[58] Field of Search ............. 55/16, 17; 165/14, 165/61, 54, 49

[56] References Cited
UNITED STATES PATENTS
2,966,235  12/1960  Kammermeyer.................. 55/16

Primary Examiner—Charles Sukalo

[57] ABSTRACT

A method and apparatus for dividing a gas into two parts: a first part which is cooler and a second part which is warmer than the original gas. The apparatus includes a molecular filter for selectively passing molecules of the original gas that have a statistical distribution of velocities which is different than the statistical distribution of molecular velocities of the original gas, and a gas pump for establishing a pressure differential across the filter. The molecules which are passed through the filter will therefore exhibit a different temperature than the molecules which are not passed through.

7 Claims, 8 Drawing Figures

INVENTOR.
KARL F. MILDE, JR.

HEATING AND COOLING DEVICE AND METHOD

CROSS REFERENCE TO RELATED APPLICATION

This application is a continuation-in-part of application Ser. No. 794,645 filed Jan. 28, 1969 by Karl F. Milde, Jr. and now abandoned.

BACKGROUND OF THE INVENTION

The present invention relates to the heating and cooling art; specifically, to the art of heating and cooling a room or rooms intended for human habitation.

All the various techniques which have been used in the art for heating or cooling a room have required an energy conversion to supply energy to (in the case of heating) or remove energy from (in the case of cooling) the air in the room. In the former case, typically a "radiator" element has been used to increase the total energy of the gaseous system of the room to be heated by conversion of energy from, say, electrical energy. In the latter case, typically an "air conditioner" unit has been used to decrease the total energy of the gaseous system by converting heat energy of the gaseous system into heat energy of a refrigerant (and then normally reconverting the heat energy of the refrigerant into heat energy of the atmosphere outside the room to be cooled). Such energy conversions are naturally less than fully efficient with the result that considerably more energy must be supplied to heat or cool the room than is actually added to or extracted from the gaseous system. In addition, particularly in the case of an air conditioner, the equipment for accomplishing the energy conversion is relatively complex and costly to produce and install.

SUMMARY OF THE INVENTION

It is an object of the present invention to provide both method and apparatus for heating and cooling a place of human habitation which is more efficient and less costly in operation and installation than the methods and apparatus of the prior art.

The present invention resides in the concept of directly changing the entropy rather than the total energy of the gaseous system so that no energy conversion is required in the heating or cooling process. This concept is effected in accordance with the present invention by separating a quantity of gas into two individual component gases; a first component gas containing molecules of the original gas which are relatively fast and a second component gas containing molecules of the original gas which are relatively slow. Although energy will be required to accomplish this separation, (i.e. to change the entropy) the method and apparatus for accomplishing the method will function much more efficiently than the heating and cooling methods and apparatus of the prior art since no internal energy must be supplied to, or removed from, the gas.

The method and apparatus of the present invention can be realized by a "molecular filter" that functions to pass molecules of a gas having high velocities in preference to molecules having slow velocities, or vice versa. The molecules passed by the molecular filter form one of the two component gases, while the molecules that remain (that are not passed) form the other. One such molecular filter, which forms the preferred embodiment of the present invention, will be described below.

As used herein, the term "filter" is intended to denote a strainer or "sieve-like" device, i.e., a device having a single input and output, which permits mass or energy of a particular type to pass from the input to the output in preference to mass or energy of another type. In addition, a filter, in its ideal sense, is a passive device; i.e., a device containing no moving parts or active elements which would be capable of operating on, varying or changing the mass or energy passed from the input to the output.

By way of explanation, it may be useful to consider an electrical band-pass filter as an example of a device for filtering energy. As is well known, a band-pass filter is comprised of one or more inductors and capacitors arranged in series, parallel, or both series and parallel. This filter is thus a two terminal device (single input-single output) comprised entirely of passive elements. It functions to pass electrical energy of a particular frequency or range of frequencies from the input to the output and to block the passage of electrical energy outside the band-pass range. In an ideal electrical filter there is no addition to (active elements) nor loss of (resistive elements) total energy. Of course, in practice some losses are experienced in the inductors and capacitors due to the resistance of those elements.

Thus, more specifically, the "molecular filter" referred to in the present application is also a two terminal passive device. It functions to permit the passage of mass (gas) of a particular type from the input to the output without changing or otherwise affecting the mass (gas). For the purposes of the present invention the only requirement of the molecular filter is that it be operative to selectively pass molecules of a gas having a statistical distribution of velocities that is different from the statistical distribution of molecular velocities in the original gas to which one side thereof is exposed. Such a molecular filter will allow the gas of the gaseous system to separate by molecular motion into two component gases which are respectively hotter and colder than the original gas; that is, by separating the original gas into component gases having, respectively, a higher and a lower statistical distribution of molecular velocities than the statistical distribution of molecular velocities of the original gas.

A molecular filter which is capable of preferentially passing higher velocity molecules may be formed by a wall having a plurality of holes or apertures therethrough. If a gas pump is provided for evacuating the region on one side of the wall, and a quantity of gas is disposed on the other side of the wall at a pressure that is greater than the pressure in the evacuated region, the molecules of this gas will continuously pass through the apertures into the evacuated region. Although some of the molecules in the evacuated region will return through the apertures to join the original gas on the other side of the wall, most will be removed by the gas pump. Since, as will be shown below, the molecules which pass through the apertures into the evacuated region will have higher speeds, on the average, than the molecules of the original quantity of gas:

1. these molecules which are removed from the evacuated region by the gas pump will form a gas which is warmer than the original; and
2. the molecules which are left behind on the other side of the wall will form a gas which is cooler than the original gas.

The theory of operation of this filter, according to the preferred embodiment of the present invention, is based on the theoretically and experimentally provable fact that, due to their greater frequency of collision, "fast" molecules have a statistically greater chance of passing through a hole in a wall than do "slow" molecules. Although this fact comes into play whenever molecules pass through a small orifice, no heating or cooling effect can normally be observed, since, when the pressures on both sides of the wall are the same, equal numbers of molecules pass in both directions through the orifice. In the device according to the present invention, however, a gas pump is provided to "catch" the statistically faster molecules that pass in one direction through an orifice.

In the case of a classical, ideal gas, the numbers of molecules disposed in the volume $dx\,dy\,dz$ ($d^3x$) and having a velocity in the range of $dv_x\,dv_y\,dv_z$ ($d^3v$), where $x$, $y$ and $z$ are coordinates of position and $v_x$, $v_y$ and $v_z$ are coordinates of velocity, is given by the so-called Maxwell-Boltzmann distribution:

$$f(xyz,\,v_xv_yv_z) = A\,e^{-\beta\epsilon} \qquad (1)$$

$\beta$ in this equation is given by $1/kT$ (where $k$ is the Boltzmann constant and $T$ the absolute temperature), $\epsilon$ is the energy and $A$ is a constant determined by the requirement that:

$$\iint f\,d^3x\,d^3V = N,$$

the total number of molecules.
Solving this equation gives:

$$A = N/V\,(m\beta/2\pi)^{3/2} \qquad (2)$$

where $m$ is the mass of an individual molecule and $V$ is the total volume of the gas.

To calculate the distribution of velocities of molecules which pass through an orifice, it is convenient to change the coordinates, making the center of the orifice the origin. Reference is made to FIG. 1 of the drawing which shows, in cross section, a wall 1 having an orifice 2 of area $dS$. The molecules incident on the orifice have a velocity vector 4 which makes an angle $\theta$ with the normal to the orifice. From equation (1), the number of molecules that have a speed $c = (v_x^2+v_y^2+v_z^2)^{one\text{-}half}$ and whose velocity vector makes an angle $\theta$ with the given axis, is $$f(c,\theta) = 2\pi A\,e^{-\beta mc^2/2}\,c^2 \sin\theta\,d\theta\,dc. \qquad (3)$$

The number of such molecules that will pass through the orifice 2 (assuming spatial homogeneity) in the time $dt$ is given by:

$$dS\,c\,\cos\theta\,dt\,f(c,\theta) \qquad (4)$$

so that, for all $\theta$ the velocity distribution of these molecules becomes:

$$2\pi Ac^3 e^{-\beta mc^2/2}dc \int_0^{\pi/2} \sin\theta\,\cos\theta\,d\theta,\ \text{or}\ \pi Ac^3 e^{-\beta mc^2/2}dc. \qquad (5)$$

If the function (3) is integrated over the same range of $\theta$, it becomes $$f(c) = 2\pi A\,c^2\,e^{-\beta mc^2/2}\,dc \qquad (6)$$

This function, the well-known Maxwell-Boltzmann distribution of molecular velocities, is shown as the curve 6 in FIG. 2. As may be seen from the figure, very few molecules of the ideal gas move with slow speeds and very few with high speeds. Most of the molecules are grouped around the maximum of the curve or the most probable speed. Because of the nonsymmetrical shape of the curve, the average speed is slightly larger than the most probable and the root mean square speed is somewhat larger than either the most probable or the average speed.

As has been proven above, the molecules which emerge through the orifice do not exhibit this distribution. Their velocities are given, rather, by the function (5) which is (constant · $c$) times the function (6). This function is illustrated by the curve 5 in FIG. 2 which shows that the maximum speed, the average speed as well as the root mean square speed will be higher than that of the molecules of the original gas. Of course, the molecules that pass through the orifice will also be describable by the Maxwell-Boltzmann (ideal gas) function when the gas which they form reaches equilibrium, but since their velocities are higher, their absolute temperature $T$ will then be higher. Since the total energy of the gaseous system must remain constant, absent the introduction or withdrawal of heat, the gas which is formed of the molecules that emerge through the orifice will be warmer, and the gas formed of the molecules that remain will be cooler than the gas which was originally placed on the right side of the wall 1 in FIG. 1.

It should be noted that the theory upon which the present invention is based assumes the presence of true "molecular flow". If the orifice is made too large, the gas will rush through it to the evacuated side of the wall causing turbulance (molecular collisions) that disturb the Maxwell-Boltzman equilibrium. However, the theory places no limits on the number of orifices which can be provided in a wall per unit area. Any limitations on the size of each orifice can therefore be compensated for by providing large numbers of orifices closely adjacent to each other.

It is preferable if the orifices be made with a diameter in the order of magnitude of the mean free path $L$, the average distance between collisions, of the molecules of the gas. However, at standard conditions this mean free path is extremely small:

$$L = 3 \cdot 10^{-5}\text{ cm},$$

or a distance slightly smaller than the wavelength of light in the visible spectrum.

Means should be provided, therefore, to make the holes simply as small, and as numerous as possible. This may be done, for example, by placing a thin foil in the path of an electric discharge. The discharge, which is not homogeneous, will penetrate the foil at a large number of randomly selected points, producing the orifices as desired.

DESCRIPTION OF THE PREFERRED EMBODIMENTS

Figure 1:
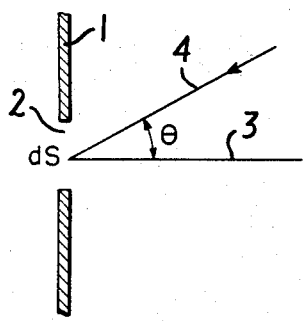
FIG. 1 is a cross-sectional view of a wall having an orifice of elemental area.
Figure 2:
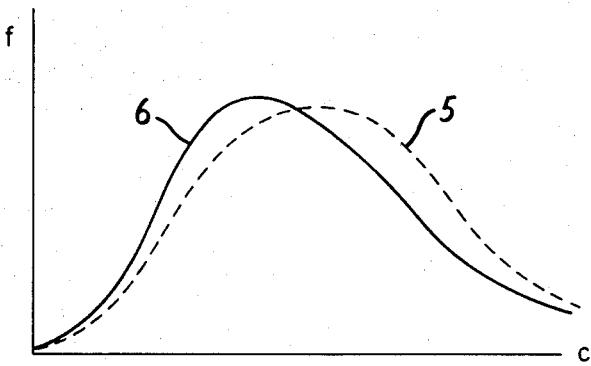
FIG. 2 is a graph of molecular distributions of velocities which illustrate the operation of the present invention.
Figure 3:
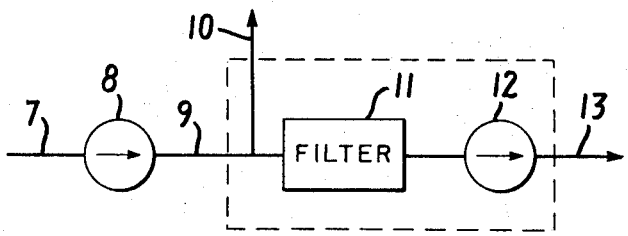
FIG. 3 is a schematic diagram of the apparatus according to the present invention.

Turning now to the drawings, FIG. 3 schematically illustrates the general nature of apparatus, according to the present invention, for continuously separating a gas into a warmer component gas and a cooler component gas.

The gas enters the system through the line 7 with the aid, if necessary, of a gas pump 8. The gas is then directed through the line 9 to the molecular filter system, according to the present invention, generally designated by the dashed lines. Part of the gas will be passed by the filter 11 and drawn by the gas pump 12 to the outlet 13. The remaining gas will simply be ejected through the outlet 10. The filter 11 can be operative either to selectively pass molecules of the gas having a statistical distribution of velocities that is greater than the statistical distribution of velocities of the gas in the line 9, or vice versa.

Figure 4:
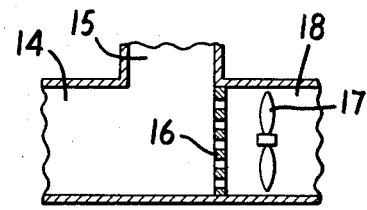
FIG. 4 is a representational diagram of the preferred embodiment of the apparatus shown in FIG. 3.

A molecular filter system having the former properties is shown, schematically, in FIG. 4. This filter system operates according to the theory of selection described in the "Summary of the Invention", above. The original gas is introduced into the tube 14 and directed against the "screen" 16. This screen is in reality a thin foil containing large numbers of small apertures. The molecules that pass through the apertures are drawn off by the gas pump, indicated by the fan 17, and passed out the outlet tube 18. The molecules that do not manage to pass through the screen 16 are passed out the outlet tube 15. As has been explained above, the gas ejected through the tube 18 will be warmer than, and the gas ejected through the tube 15 will be cooler than the original gas that entered the tube 14.

Figure 5:
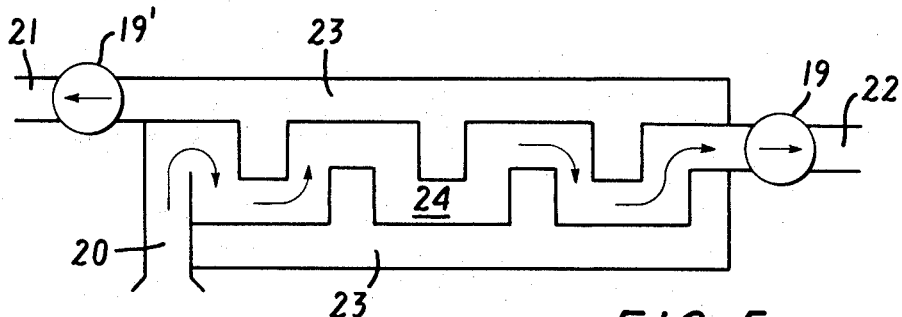
FIG. 5 is a representational diagram of apparatus, constructed according to the preferred embodiment of the present invention, for continuously separating a gas into warmer and cooler gases.
Figure 6:
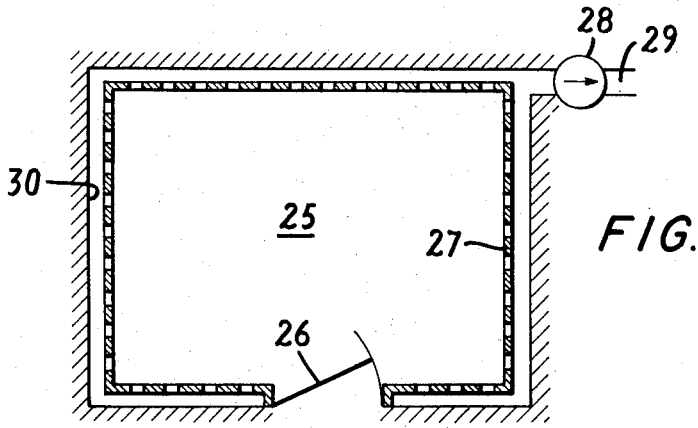
FIG. 6 is a representational diagram of apparatus, constructed according to a preferred embodiment of the present invention, for cooling a room.

FIGS. 5 and 6 illustrate two practical forms which the molecular filter system embodiment of FIG. 4 can take. The system shown in FIG. 5 is operative to separate large amounts of gas into warmer and cooler gases, respectively, and the system shown in FIG. 6 is operative to cool a room.

The apparatus of FIG. 5 includes an inlet tube 20, a filter tube 24 and an outlet tube 22. The region 23 surrounding the filter tube is connected to a second outlet tube 21. Air is drawn through the filter tube 24 and is exhausted from the region 23 by means of two gas pumps 19 and 19', respectively.

This apparatus operates in a manner identical to the molecular filter system embodiment of FIG. 4. In this case, however, the incoming gas is caused to flow against numerous surfaces of the filter tube so that a large proportion of this gas will pass into the evacuated region 23 and be exhausted by the pump 19'. In other words, the filter tube is provided with sufficient "screen" or aperture-filled surfaces to cause the desired degree of separation of the incoming gas.

FIG. 6 shows a plan view of a room 25 provided with "false walls" 27 containing a plurality of apertures. The region behind the walls is evacuated by a gas pump 28 which discharges the exhaust gases into the atmosphere 29. The room 25 is also provided with a door 26 and a solid wall 30.

The false walls 27 act to continuously filter through the fast molecules of the gas in the room. Although the warm gas which is removed is continuously replenished by the outside air passing in through the doorway, the room will be cooled since the gases removed will be warmer than the replenishing gases. The apparatus shown in FIG. 6 thus acts as a type of "air conditioner" to circulate and cool the air in the room.

Although the system in FIG. 6 is illustrated as having false walls spaced a short distance away from the true walls of the room, it is more practical to provide the room with a "false ceiling" instead. If a false ceiling is constructed as the molecular filter there is less danger of damage to the filter and the filter will be effective to receive and withdraw the warmer air in the room as it rises.

Conveniently, the ceiling filter system can be constructed as part of the false ceiling which is already commonly used to hide ventilation pipes, wiring, etc., in modern buildings. It is only necessary to replace the usual acoustic tiles with tiles having the appropriate apertures and install a blower of sufficient capacity to establish a partial vacuum above the tiles. The "filter tiles" can preferably be constructed in a manner similar to the acoustic tiles in present use, but provided on their upper side with a thin foil containing apertures of appropriately small size. If the body of the tile is made sufficiently porous, the gas molecules will diffuse through it and then be filtered through the apertures of the foil.

Figure 7A:
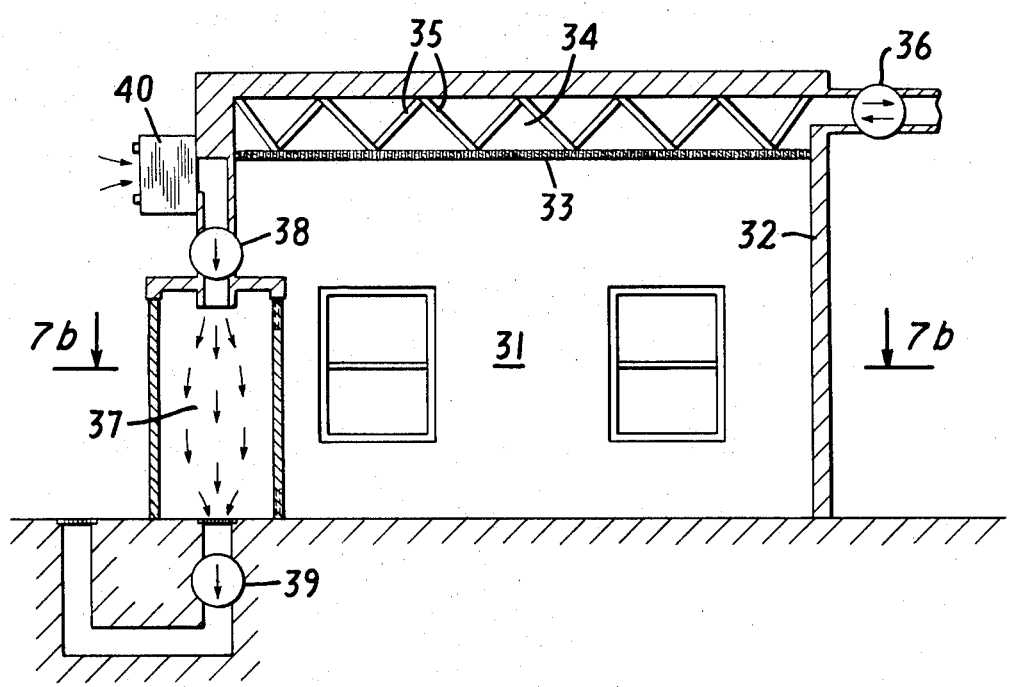
FIGS. 7a and 7b are side and top cross-sectional views, respectively, of apparatus, constructed according to a further preferred embodiment of the present invention, for cooling a room.

A false ceiling of the above-described type is illustrated in FIG. 7a. This figure shows a room 31 surrounded by vertical walls 32 and a horizontal ceiling 33. The ceiling is formed by a molecular filter which is capable of selectively passing molecules of air which have statistical distribution of velocities which is greater, or lesser, than the statistical distribution of velocities of the molecules that impinge thereon. The space 34 above the ceiling 33 contains only braces 35 for holding the ceiling 33 and can be evacuated or pressurized by an airpump 36.

If a molecular filter is chosen which selectively passes air having a higher temperature than the air impinging thereon, the room may be cooled by evacuating the space 34 or may be heated by pressurizing the space 34 with respect to the room 31. If a molecular filter is chosen which selectively passes air having a lower temperature than the air impinging thereon, the room may be cooled by pressurizing the space 34 or may be heated by evacuating the space 34 with respect to the room 31.

Figure 7B:
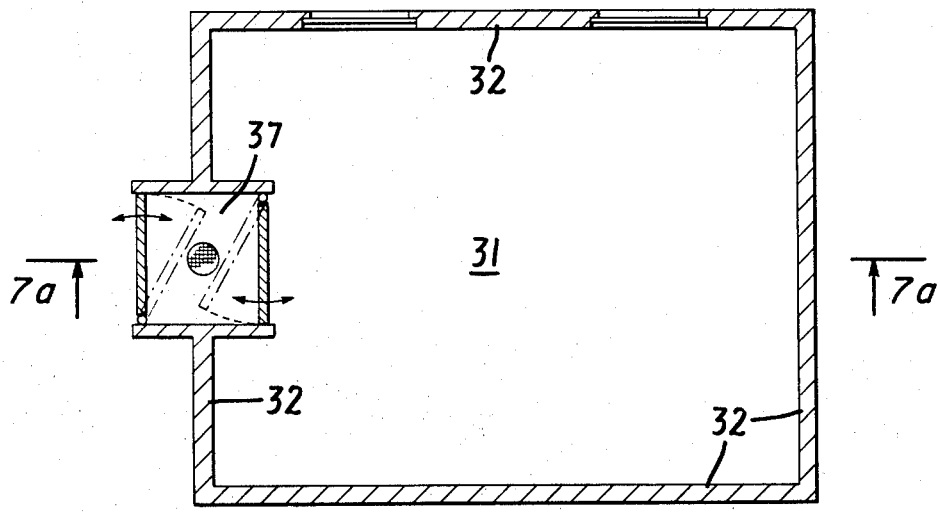

In order to prevent the air which enters through doorways from adversely affecting the temperature equilibrium established by the heating and cooling device and method according to the present invention, the air in the doorway region may be heated or cooled, as desired, by a conventional heating or cooling device. This may be accomplished, in the manner shown in FIG. 7b by means of a double door arrangement and an airstream 37 passed through the region between the doors by airpumps 38 and 39. Prior to insertion into the region between the doors, the air is heated or cooled, as desired, by a conventional heating or cooling device 40.

It should be emphasized that the conventional heating or cooling device 40 does not replace the function of the molecular filter 33, but merely serves to heat or cool the air which enters through the doors from outside the building. Depending upon the size of the building and the size and frequency of use of the doorway or doorways, the conventional heating or cooling device should provide only a small fraction of the total effective heating or cooling in the building.

It will be understood that the above description of the present invention is susceptible to various modifications, changes and adaptations. Although an apertured foil has been described herein as the preferred embodiment of the molecular filter according to the present invention, it will be appreciated that various other temperature-selective filters may be provided as well. For example, a simple gauze filter (made of cotton, fiberglass, or other gauze material) or some other specially fabricated semi-permeable membrane may be used as the molecular filter for selectively passing molecules of a gas which have a statistical distribution of molecular velocities that is different from the statistical distribution of molecular velocities of the gas which impinges on one side thereof.

Accordingly, it is intended that the scope of the present invention be limited only by the following claims.

I claim:

1. In a human habitation having enclosing surfaces including substantially vertical wall surfaces and a substantially horizontal ceiling surface, the improvement wherein at least one of the enclosing surfaces is formed, at least in part, by a molecular filter for selectively passing air of a different temperature than the air impinging on one side thereof and wherein means are provided for establishing a pressure differential across said molecular filter, thereby to change the temperature in the habitation.

2. The improvement defined in claim 1, wherein said ceiling surface is formed, at least in part, by said molecular filter.

3. The improvement defined in claim 1, wherein substantially all of said ceiling surface is formed by said molecular filter.

4. The improvement defined in claim 1, wherein said molecular filter is an apertured partition.

5. The improvement defined in claim 2, wherein said means for establishing a pressure differential include means for withdrawing air from the region above said ceiling and discharging the air withdrawn outside the habitation.

6. The improvement defined in claim 1, wherein the temperature within the habitation is increased and means are provided for heating air which enters the habi-tation through doorways.

7. The improvement defined in claim 1, wherein the temperature within the habitation is decreased and means are provided for cooling air which enters the habitation through doorways.

* * * * *